(12) United States Patent
Chapman, Jr. et al.

(10) Patent No.: US 11,790,121 B2
(45) Date of Patent: Oct. 17, 2023

(54) SYSTEM AND METHOD FOR DETECTING APPLIANCE TAMPERING

(71) Applicant: Haier US Appliance Solutions, Inc., Wilmington, DE (US)

(72) Inventors: John Gilman Chapman, Jr., Louisville, KY (US); Ryan James Scheckelhoff, Louisville, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 44 days.

(21) Appl. No.: 17/383,701

(22) Filed: Jul. 23, 2021

(65) Prior Publication Data

US 2023/0029114 A1    Jan. 26, 2023

(51) Int. Cl.
| | |
|---|---|
| G06F 21/86 | (2013.01) |
| G06F 21/82 | (2013.01) |
| H01R 13/66 | (2006.01) |
| G06Q 20/38 | (2012.01) |

(52) U.S. Cl.
CPC .............. *G06F 21/86* (2013.01); *G06F 21/82* (2013.01); *G06Q 20/382* (2013.01); *H01R 13/6691* (2013.01)

(58) Field of Classification Search
CPC ........ G06F 21/86; G06F 21/82; G06Q 20/382; H01R 13/6691
See application file for complete search history.

(56) References Cited

U.S. PATENT DOCUMENTS

| | | | | |
|---|---|---|---|---|
| 8,181,239 | B2* | 5/2012 | Pandya | H04L 69/12 726/13 |
| 8,347,355 | B2* | 1/2013 | Mower et al. | H04L 67/025 726/5 |
| 8,588,990 | B2 | 11/2013 | Caceres et al. | |
| 8,595,834 | B2 | 11/2013 | Xie et al. | |
| 8,719,909 | B2 | 5/2014 | Fitzgerald et al. | |
| 8,935,742 | B2* | 1/2015 | Nice et al. | G06F 21/56 726/13 |
| 10,129,239 | B2* | 11/2018 | Bell et al. | H04L 63/1433 |
| 10,630,674 | B2* | 4/2020 | Bell et al. | H04L 63/0823 |
| 10,812,526 | B2* | 10/2020 | Apelewicz et al. | H04L 9/0861 |
| 10,855,699 | B2 | 12/2020 | Park et al. | |
| 10,979,454 | B1* | 4/2021 | Hodgman et al. | H04L 63/0281 |
| 11,005,879 | B2* | 5/2021 | Barnes | H04L 67/30 |
| 11,258,763 | B2* | 2/2022 | Cummins et al. | H04L 63/0263 |
| 11,265,347 | B2* | 3/2022 | Hastings | H04L 63/0245 |
| 11,314,871 | B2* | 4/2022 | Ross et al. | G06F 21/554 |
| 2009/0253406 | A1 | 10/2009 | Fitzgerald et al. | |
| 2014/0109182 | A1 | 4/2014 | Gordon et al. | |
| 2017/0093910 | A1 | 3/2017 | Gukal et al. | |
| 2018/0309786 | A1* | 10/2018 | Apelewicz et al. | H04W 12/04 |

FOREIGN PATENT DOCUMENTS

CN        211233597 U      8/2020

* cited by examiner

*Primary Examiner* — Hosuk Song
(74) *Attorney, Agent, or Firm* — Dority & Manning, P.A.

(57) ABSTRACT

An appliance includes an external communication port, such as an RJ45 port, and a wireless communication module in wireless communication with a remote server through an external network. A controller is configured to detect port activity at the external communication port, e.g., by detecting a plug-in or data transfer, transmit a notification of the port activity to the remote server using the wireless communication module, receive an activity assessment, e.g., such as an activity approval or disapproval, from the remote server, and adjust at least one operating parameter of the appliance in response to the activity assessment.

20 Claims, 4 Drawing Sheets

SYSTEM AND METHOD FOR DETECTING APPLIANCE TAMPERING

FIELD OF THE INVENTION

The present subject matter relates generally to appliances, or more specifically, to methods of operating commercial appliances to prevent unauthorized use or tampering.

BACKGROUND OF THE INVENTION

Certain conventional laundry appliances are becoming more connected with features that involve financial transactions or which may otherwise require owner approval to perform an operating cycle. For example, certain commercial appliances, such as washing machines and clothes dryers at a laundromat, might have cash-based operating systems that require a user to input cash or coins into the appliance before an operating cycle will begin. Similarly, purchasers of residential appliances may purchase an appliance with hopes of recouping some of the purchase price by charging for appliance usage. This may be common particularly in light of the rise of shared living arrangements, home rental services, and other shared appliance situations. For example, a homeowner who rents their house on a rental website might wish to charge renters for their use of the appliance, a tenant who purchases an appliance may wish to charge their roommates for appliance use, or an appliance owner may wish to generate a revenue steam from owned appliances in other situations as well.

Such pay-per-use commercial appliances may be exposed to an increased likelihood of appliance tampering. In this regard, given the financial incentive, it is more likely that consumers or others will try to tamper with these appliances in order to get features or functions of the appliances for free. By contrast, conventional appliances, even when utilized partially for commercial purposes, may frequently be used by the owner who may not want to pay for usage. In addition, maintenance technicians may need to operate the appliance or initiate various features when performing service or maintenance on the appliance.

Accordingly, systems and methods for identifying tampering of an appliance would be desirable. More specifically, a system for identifying and unauthorized appliance usage and implementing corrective action, such as by stopping the tampering, canceling or preventing associated financial transactions, or otherwise disabling the appliance would be particularly beneficial.

BRIEF DESCRIPTION OF THE INVENTION

Advantages of the invention will be set forth in part in the following description, or may be apparent from the description, or may be learned through practice of the invention.

In one exemplary embodiment, an appliance is provided including a cabinet, an external communication port positioned on the cabinet, a wireless communication module in wireless communication with a remote server through an external network, and a controller in operative communication with the external communication port and the wireless communication module. The controller is configured to detect port activity at the external communication port, transmit a notification of the port activity to the remote server using the wireless communication module, receive an activity assessment from the remote server, and adjust at least one operating parameter of the appliance in response to the activity assessment.

In another exemplary embodiment, a method of operating an appliance is provided. The appliance includes an external communication port and a wireless communication module in wireless communication with a remote server through an external network. The method includes detecting port activity at the external communication port, transmitting a notification of the port activity to the remote server using the wireless communication module, receiving an activity assessment from the remote server, and adjusting at least one operating parameter of the appliance in response to the activity assessment.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first," "second," and "third" may be used interchangeably to distinguish one component from another and are not intended to signify location or importance of the individual components. The terms "includes" and "including" are intended to be inclusive in a manner similar to the term "comprising." Similarly, the term "or" is generally intended to be inclusive (i.e., "A or B" is intended to mean "A or B or both"). In addition, here and throughout the specification and claims, range limitations may be combined and/or interchanged. Such ranges are identified and include all the sub-ranges contained therein unless context or language indicates otherwise. For example, all ranges disclosed herein are inclusive of the endpoints, and the endpoints are independently combinable with each other. The singular forms "a," "an," and "the" include plural references unless the context clearly dictates otherwise.

Approximating language, as used herein throughout the specification and claims, may be applied to modify any quantitative representation that could permissibly vary without resulting in a change in the basic function to which it is related. Accordingly, a value modified by a term or terms, such as "generally," "about," "approximately," and "substantially," are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 10 percent margin, i.e., including values within ten percent greater or less than the stated value. In this regard, for example, when used in the context of an angle or direction, such terms include within ten degrees greater or less than the stated angle or direction, e.g., "generally vertical" includes forming an angle of up to ten degrees in any direction, e.g., clockwise or counter-clockwise, with the vertical direction V.

The word "exemplary" is used herein to mean "serving as an example, instance, or illustration." In addition, references to "an embodiment" or "one embodiment" does not necessarily refer to the same embodiment, although it may. Any implementation described herein as "exemplary" or "an embodiment" is not necessarily to be construed as preferred or advantageous over other implementations. Moreover, each example is provided by way of explanation of the invention, not limitation of the invention. In fact, it will be apparent to those skilled in the art that various modifications and variations can be made in the present invention without departing from the scope of the invention. For instance, features illustrated or described as part of one embodiment can be used with another embodiment to yield a still further embodiment. Thus, it is intended that the present invention covers such modifications and variations as come within the scope of the appended claims and their equivalents.

Figure 1:
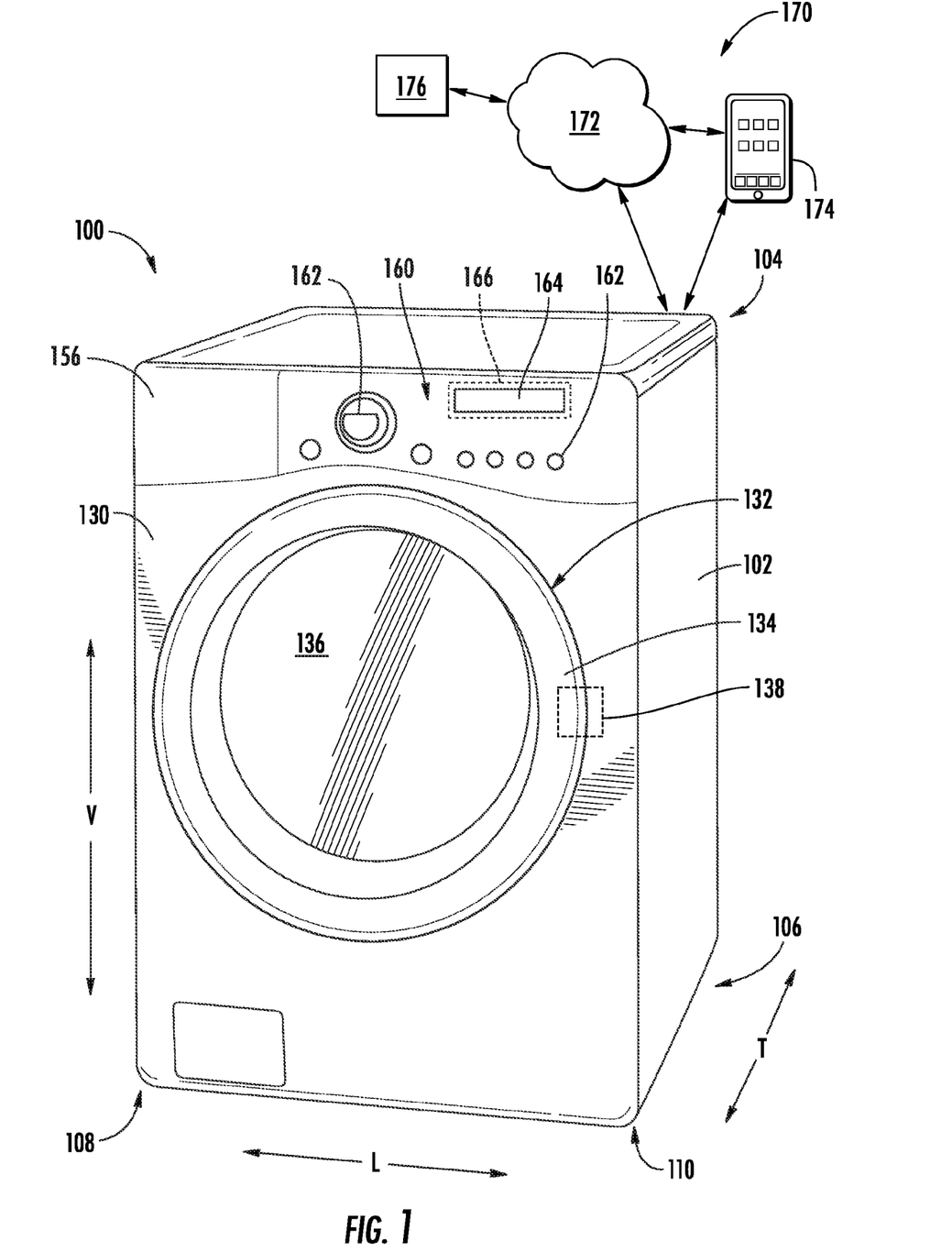
FIG. 1 provides a perspective view of an exemplary washing machine appliance according to an exemplary embodiment of the present subject matter.
Figure 2:
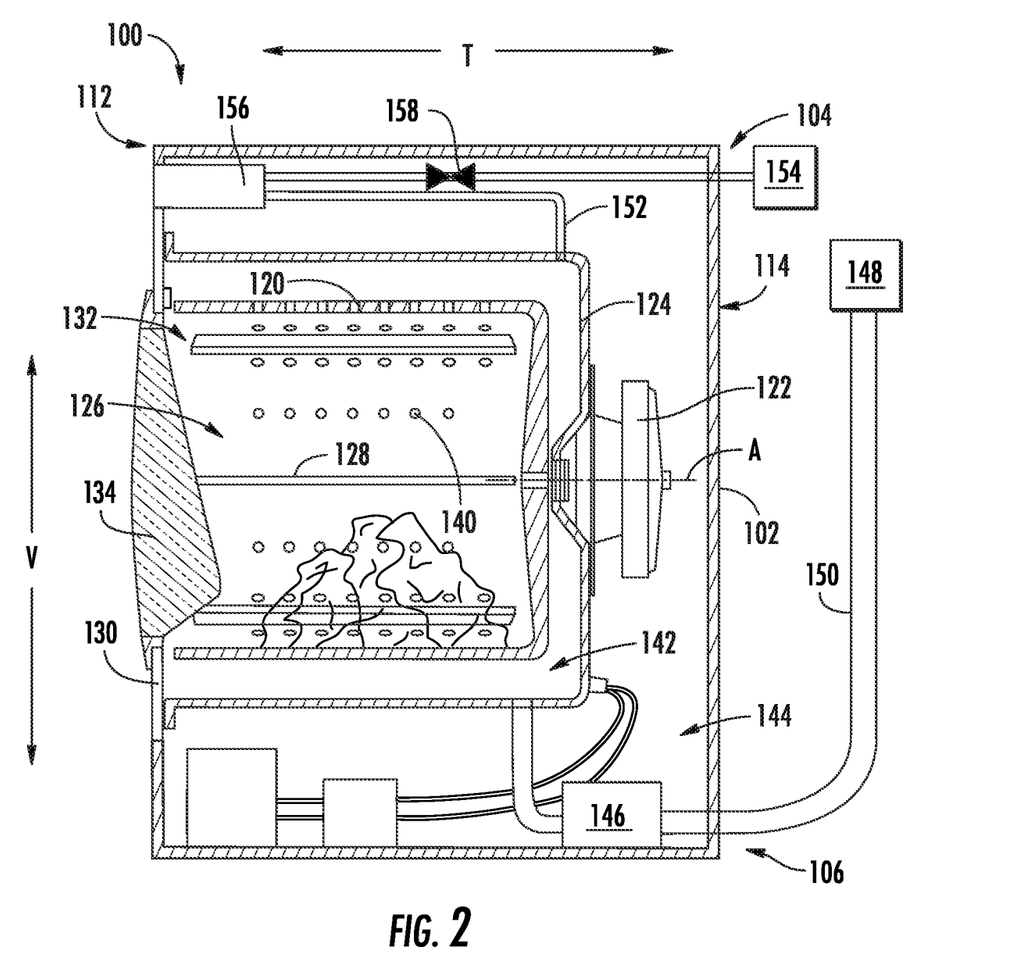
FIG. 2 provides a side cross-sectional view of the exemplary washing machine appliance of FIG. 1.

Referring now to the figures, an exemplary laundry appliance that may be used to implement aspects of the present subject matter will be described. Specifically, FIG. 1 is a perspective view of an exemplary horizontal axis washing machine appliance 100 and FIG. 2 is a side cross-sectional view of washing machine appliance 100. As illustrated, appliance 100 generally defines a vertical direction V, a lateral direction L, and a transverse direction T, each of which is mutually perpendicular, such that an orthogonal coordinate system is generally defined.

According to exemplary embodiments, washing machine appliance 100 includes a cabinet 102 that is generally configured for containing and/or supporting various components of washing machine appliance 100 and which may also define one or more internal chambers or compartments of washing machine appliance 100. In this regard, as used herein, the terms "cabinet," "housing," and the like are generally intended to refer to an outer frame or support structure for washing machine appliance 100, e.g., including any suitable number, type, and configuration of support structures formed from any suitable materials, such as a system of elongated support members, a plurality of interconnected panels, or some combination thereof. It should be appreciated that cabinet 102 does not necessarily require an enclosure and may simply include open structure supporting various elements of washing machine appliance 100. By contrast, cabinet 102 may enclose some or all portions of an interior of cabinet 102. It should be appreciated that cabinet 102 may have any suitable size, shape, and configuration while remaining within the scope of the present subject matter.

As illustrated, cabinet 102 generally extends between a top 104 and a bottom 106 along the vertical direction V, between a first side 108 (e.g., the left side when viewed from the front as in FIG. 1) and a second side 110 (e.g., the right side when viewed from the front as in FIG. 1) along the lateral direction L, and between a front 112 and a rear 114 along the transverse direction T. In general, terms such as "left," "right," "front," "rear," "top," or "bottom" are used with reference to the perspective of a user accessing washing machine appliance 100.

Referring to FIG. 2, a wash basket 120 is rotatably mounted within cabinet 102 such that it is rotatable about an axis of rotation A. A motor 122, e.g., such as a pancake motor, is in mechanical communication with wash basket 120 to selectively rotate wash basket 120 (e.g., during an agitation or a rinse cycle of washing machine appliance 100). Wash basket 120 is received within a wash tub 124 and defines a wash chamber 126 that is configured for receipt of articles for washing. The wash tub 124 holds wash and rinse fluids for agitation in wash basket 120 within wash tub 124. As used herein, "wash fluid" may refer to water, detergent, fabric softener, bleach, or any other suitable wash additive or combination thereof. Indeed, for simplicity of discussion, these terms may all be used interchangeably herein without limiting the present subject matter to any particular "wash fluid."

Wash basket 120 may define one or more agitator features that extend into wash chamber 126 to assist in agitation and cleaning articles disposed within wash chamber 126 during operation of washing machine appliance 100. For example, as illustrated in FIG. 2, a plurality of ribs 128 extends from basket 120 into wash chamber 126. In this manner, for example, ribs 128 may lift articles disposed in wash basket 120 during rotation of wash basket 120.

Referring generally to FIGS. 1 and 2, cabinet 102 also includes a front panel 130 which defines an opening 132 that permits user access to wash basket 120 of wash tub 124. More specifically, washing machine appliance 100 includes a door 134 that is positioned over opening 132 and is rotatably mounted to front panel 130. In this manner, door 134 permits selective access to opening 132 by being movable between an open position (not shown) facilitating access to a wash tub 124 and a closed position (FIG. 1) prohibiting access to wash tub 124.

A window 136 in door 134 permits viewing of wash basket 120 when door 134 is in the closed position, e.g., during operation of washing machine appliance 100. Door 134 also includes a handle (not shown) that, e.g., a user may pull when opening and closing door 134. Further, although door 134 is illustrated as mounted to front panel 130, it should be appreciated that door 134 may be mounted to another side of cabinet 102 or any other suitable support according to alternative embodiments. Washing machine appliance 100 may further include a latch assembly 138 (see FIG. 1) that is mounted to cabinet 102 and/or door 134 for selectively locking door 134 in the closed position and/or confirming that the door is in the closed position. Latch assembly 138 may be desirable, for example, to ensure only secured access to wash chamber 126 or to otherwise ensure and verify that door 134 is closed during certain operating cycles or events.

Referring again to FIG. 2, wash basket 120 also defines a plurality of perforations 140 in order to facilitate fluid communication between an interior of basket 120 and wash tub 124. A sump 142 is defined by wash tub 124 at a bottom of wash tub 124 along the vertical direction V. Thus, sump 142 is configured for receipt of and generally collects wash fluid during operation of washing machine appliance 100. For example, during operation of washing machine appliance 100, wash fluid may be urged by gravity from basket 120 to sump 142 through plurality of perforations 140.

A drain pump assembly 144 is located beneath wash tub 124 and is in fluid communication with sump 142 for periodically discharging soiled wash fluid from washing machine appliance 100. Drain pump assembly 144 may generally include a drain pump 146 which is in fluid communication with sump 142 and with an external drain 148 through a drain hose 150. During a drain cycle, drain pump 146 urges a flow of wash fluid from sump 142, through drain hose 150, and to external drain 148. More specifically, drain pump 146 includes a motor (not shown) which is energized during a drain cycle such that drain pump 146 draws wash fluid from sump 142 and urges it through drain hose 150 to external drain 148.

Washing machine appliance 100 may further include a wash fluid dispenser that is generally configured for dispensing a flow of water, wash fluid, etc. into wash tub 124. For example, a spout 152 is configured for directing a flow of fluid into wash tub 124. For example, spout 152 may be in fluid communication with a water supply 154 (FIG. 2) in order to direct fluid (e.g., clean water or wash fluid) into wash tub 124. Spout 152 may also be in fluid communication with the sump 142. For example, pump assembly 144 may direct wash fluid disposed in sump 142 to spout 152 in order to circulate wash fluid in wash tub 124.

As illustrated in FIG. 2, a detergent drawer 156 is slidably mounted within front panel 130. Detergent drawer 156 receives a wash additive (e.g., detergent, fabric softener, bleach, or any other suitable liquid or powder) and directs the fluid additive to wash tub 124 during operation of washing machine appliance 100. According to the illustrated embodiment, detergent drawer 156 may also be fluidly coupled to spout 152 to facilitate the complete and accurate dispensing of wash additive. It should be appreciated that according to alternative embodiments, these wash additives could be dispensed automatically via a bulk dispensing unit (not shown). Other systems and methods for providing wash additives are possible and within the scope of the present subject matter.

In addition, a water supply valve 158 may provide a flow of water from a water supply source (such as a municipal water supply 154) into detergent dispenser 156 and into wash tub 124. In this manner, water supply valve 158 may generally be operable to supply water into detergent dispenser 156 to generate a wash fluid, e.g., for use in a wash cycle, or a flow of fresh water, e.g., for a rinse cycle. It should be appreciated that water supply valve 158 may be positioned at any other suitable location within cabinet 102. In addition, although water supply valve 158 is described herein as regulating the flow of "wash fluid," it should be appreciated that this term includes, water, detergent, other additives, or some mixture thereof.

Referring again to FIG. 1, washing machine appliance 100 may include a control panel 160 that may represent a general-purpose Input/Output ("GPIO") device or functional block for washing machine appliance 100. In some embodiments, control panel 160 may include or be in operative communication with one or more user input devices 162, such as one or more of a variety of digital, analog, electrical, mechanical, or electro-mechanical input devices including rotary dials, control knobs, push buttons, toggle switches, selector switches, and touch pads. Additionally, washing machine appliance 100 may include a display 164, such as a digital or analog display device generally configured to provide visual feedback regarding the operation of washing machine appliance 100. For example, display 164 may be provided on control panel 160 and may include one or more status lights, screens, or visible indicators. According to exemplary embodiments, user input devices 162 and display 164 may be integrated into a single device, e.g., including one or more of a touchscreen interface, a capacitive touch panel, a liquid crystal display (LCD), a plasma display panel (PDP), a cathode ray tube (CRT) display, or other informational or interactive displays.

Washing machine appliance 100 may further include or be in operative communication with a processing device or a controller 166 that may be generally configured to facilitate appliance operation. In this regard, control panel 160, user input devices 162, and display 164 may be in communication with controller 166 such that controller 166 may receive control inputs from user input devices 162, may display information using display 164, and may otherwise regulate operation of washing machine appliance 100. For example, signals generated by controller 166 may operate washing machine appliance 100, including any or all system components, subsystems, or interconnected devices, in response to the position of user input devices 162 and other control commands. Control panel 160 and other components of washing machine appliance 100 may be in communication with controller 166 via, for example, one or more signal lines or shared communication busses. In this manner, Input/Output ("I/O") signals may be routed between controller 166 and various operational components of washing machine appliance 100.

As used herein, the terms "processing device," "computing device," "controller," or the like may generally refer to any suitable processing device, such as a general or special purpose microprocessor, a microcontroller, an integrated circuit, an application specific integrated circuit (ASIC), a digital signal processor (DSP), a field-programmable gate array (FPGA), a logic device, one or more central processing units (CPUs), a graphics processing units (GPUs), processing units performing other specialized calculations, semiconductor devices, etc. In addition, these "controllers" are not necessarily restricted to a single element but may include any suitable number, type, and configuration of processing devices integrated in any suitable manner to facilitate appliance operation. Alternatively, controller 166 may be constructed without using a microprocessor, e.g., using a combination of discrete analog and/or digital logic circuitry (such as switches, amplifiers, integrators, comparators, flip-flops, AND/OR gates, and the like) to perform control functionality instead of relying upon software.

Controller 166 may include, or be associated with, one or more memory elements or non-transitory computer-readable storage mediums, such as RAM, ROM, EEPROM, EPROM, flash memory devices, magnetic disks, or other suitable memory devices (including combinations thereof). These memory devices may be a separate component from the processor or may be included onboard within the processor. In addition, these memory devices can store information and/or data accessible by the one or more processors, including instructions that can be executed by the one or more processors. It should be appreciated that the instructions can be software written in any suitable programming language or can be implemented in hardware. Additionally, or alternatively, the instructions can be executed logically and/or virtually using separate threads on one or more processors.

For example, controller 166 may be operable to execute programming instructions or micro-control code associated with an operating cycle of washing machine appliance 100. In this regard, the instructions may be software or any set of instructions that when executed by the processing device, cause the processing device to perform operations, such as running one or more software applications, displaying a user interface, receiving user input, processing user input, etc. Moreover, it should be noted that controller 166 as disclosed herein is capable of and may be operable to perform any methods, method steps, or portions of methods as disclosed herein. For example, in some embodiments, methods disclosed herein may be embodied in programming instructions stored in the memory and executed by controller 166.

The memory devices may also store data that can be retrieved, manipulated, created, or stored by the one or more processors or portions of controller 166. The data can include, for instance, data to facilitate performance of methods described herein. The data can be stored locally (e.g., on controller 166) in one or more databases and/or may be split up so that the data is stored in multiple locations. In addition, or alternatively, the one or more database(s) can be connected to controller 166 through any suitable network(s), such as through a high bandwidth local area network (LAN) or wide area network (WAN). In this regard, for example, controller 166 may further include a communication module or interface that may be used to communicate with one or more other component(s) of washing machine appliance 100, controller 166, an external appliance controller, or any other suitable device, e.g., via any suitable communication lines or network(s) and using any suitable communication protocol. The communication interface can include any suitable components for interfacing with one or more network(s), including for example, transmitters, receivers, ports, controllers, antennas, or other suitable components.

Referring still to FIG. 1, a schematic diagram of an external communication system 170 will be described according to an exemplary embodiment of the present subject matter. In general, external communication system 170 is configured for permitting interaction, data transfer, and other communications between washing machine appliance 100 and one or more external devices. For example, this communication may be used to provide and receive operating parameters, user instructions or notifications, performance characteristics, user preferences, or any other suitable information for improved performance of washing machine appliance 100. In addition, it should be appreciated that external communication system 170 may be used to transfer data or other information to improve performance of one or more external devices or appliances and/or improve user interaction with such devices.

For example, external communication system 170 permits controller 166 of washing machine appliance 100 to communicate with a separate device external to washing machine appliance 100, referred to generally herein as an external device 174. As described in more detail below, these communications may be facilitated using a wired or wireless connection, such as via a network 172. In general, external device 174 may be any suitable device separate from washing machine appliance 100 that is configured to provide and/or receive communications, information, data, or commands from a user. In this regard, external device 174 may be, for example, a personal phone, a smartphone, a tablet, a laptop or personal computer, a wearable device, a smart home system, or another mobile or remote device.

In addition, a remote server 176 may be in communication with washing machine appliance 100 and/or external device 174 through network 172. In this regard, for example, remote server 176 may be a cloud-based server 176, and is thus located at a distant location, such as in a separate state, country, etc. According to an exemplary embodiment, external device 174 may communicate with a remote server 176 over network 172, such as the Internet, to transmit/receive data or information, provide user inputs, receive user notifications or instructions, interact with or control washing machine appliance 100, etc. In addition, external device 174 and remote server 176 may communicate with washing machine appliance 100 to communicate similar information.

In general, communication between washing machine appliance 100, external device 174, remote server 176, and/or other user devices or appliances may be carried using any type of wired or wireless connection and using any suitable type of communication network, non-limiting examples of which are provided below. For example, external device 174 may be in direct or indirect communication with washing machine appliance 100 through any suitable wired or wireless communication connections or interfaces, such as network 172. For example, network 172 may include one or more of a local area network (LAN), a wide area network (WAN), a personal area network (PAN), the Internet, a cellular network, any other suitable short- or long-range wireless networks, etc. In addition, communications may be transmitted using any suitable communications devices or protocols, such as via Wi-Fi®, Bluetooth®, Zigbee®, wireless radio, laser, infrared, Ethernet type devices and interfaces, etc. In addition, such communication may use a variety of communication protocols (e.g., TCP/IP, HTTP, SMTP, FTP), encodings or formats (e.g., HTML, XML), and/or protection schemes (e.g., VPN, secure HTTP, SSL).

External communication system 170 is described herein according to an exemplary embodiment of the present subject matter. However, it should be appreciated that the exemplary functions and configurations of external communication system 170 provided herein are used only as examples to facilitate description of aspects of the present subject matter. System configurations may vary, other communication devices may be used to communicate directly or indirectly with one or more associated appliances, other communication protocols and steps may be implemented, etc. These variations and modifications are contemplated as within the scope of the present subject matter.

During operation of washing machine appliance 100, laundry items are loaded into wash basket 120 through opening 132, and washing operation is initiated through operator manipulation of input selectors 162. Wash tub 124 is filled with water, detergent, and/or other fluid additives, e.g., via spout 152 and/or detergent drawer 156. One or more valves (e.g., water supply valve 158) can be controlled by washing machine appliance 100 to provide for filling wash basket 120 to the appropriate level for the amount of articles being washed and/or rinsed. By way of example for a wash mode, once wash basket 120 is properly filled with fluid, the contents of wash basket 120 can be agitated (e.g., with ribs 128) for washing of laundry items in wash basket 120.

After the agitation phase of the wash cycle is completed, wash tub 124 can be drained. Laundry articles can then be rinsed by again adding fluid to wash tub 124, depending on the particulars of the cleaning cycle selected by a user. Ribs 128 may again provide agitation within wash basket 120. One or more spin cycles may also be used. In particular, a spin cycle may be applied after the wash cycle and/or after the rinse cycle in order to wring wash fluid from the articles being washed. During a final spin cycle, basket 120 is rotated at relatively high speeds and drain assembly 144 may discharge wash fluid from sump 142. After articles disposed in wash basket 120 are cleaned, washed, and/or rinsed, the user can remove the articles from wash basket 120, e.g., by opening door 134 and reaching into wash basket 120 through opening 132.

While described in the context of a specific embodiment of horizontal axis washing machine appliance 100, using the teachings disclosed herein it will be understood that horizontal axis washing machine appliance 100 is provided by way of example only. Other washing machine appliances having different configurations, different appearances, and/or different features may also be utilized with the present subject matter as well, e.g., vertical axis washing machine appliances. In addition, aspects of the present subject matter may be utilized in any other suitable appliance, particularly those utilized in a commercial setting. For example, aspects of the present subject matter may be utilized in refrigerators, ovens, dishwashers, etc.

Figure 3:
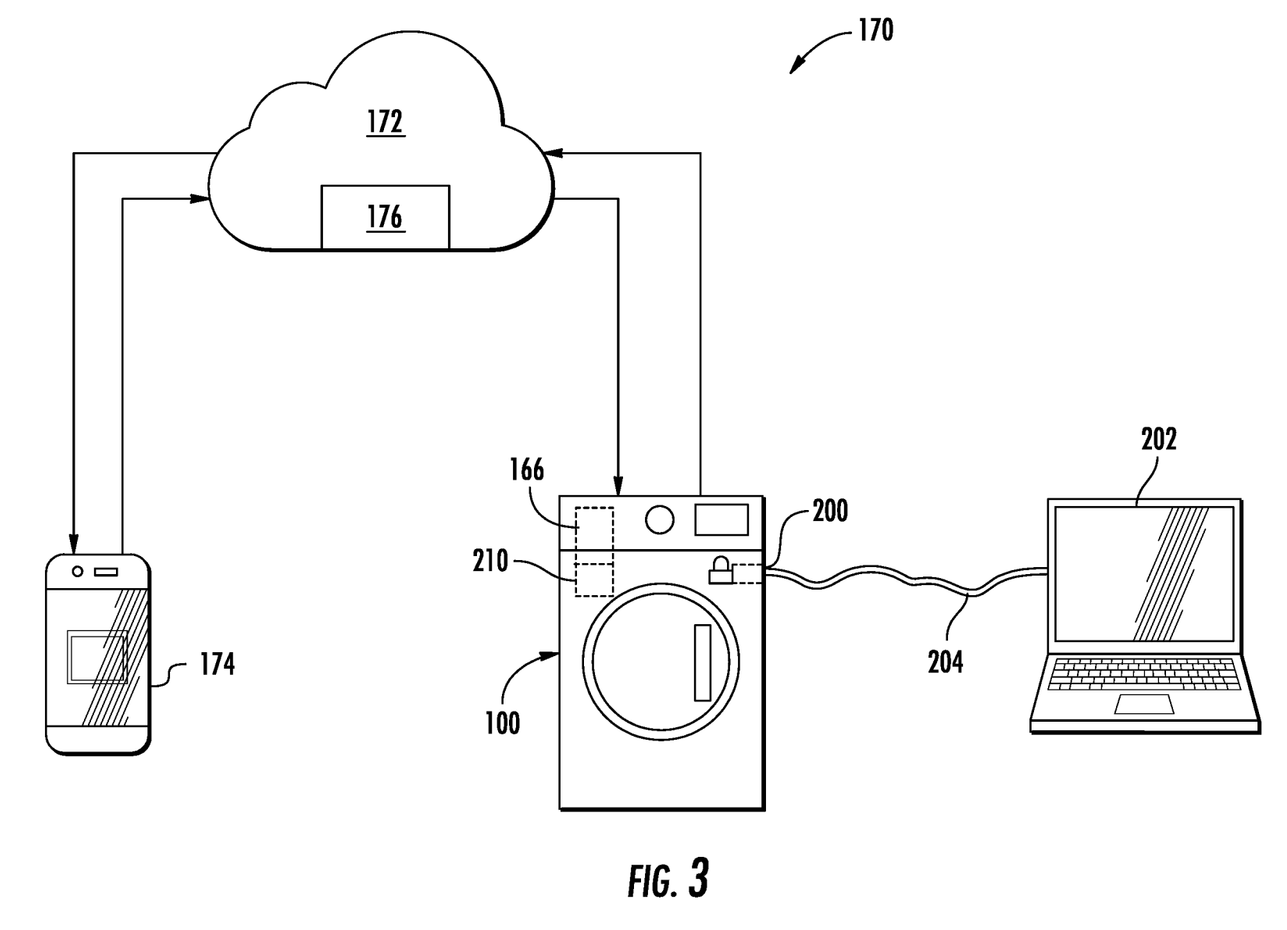
FIG. 3 provides an appliance external communication system that may be used with the exemplary washing machine appliance of FIG. 1 according to an exemplary embodiment of the present subject matter.

Referring now briefly to FIG. 3, a system and method for connecting an appliance such as washing machine appliance 100 to a remote server or network in accordance with aspects of the present subject matter will be described. For example, FIG. 3 may represent another system configuration or a practical implementation of external communication system 170 and washing machine appliance 100 as described above. Accordingly, like reference numerals may be used to refer to the same or similar features among embodiments.

Specifically, as illustrated, washing machine appliance 100 may generally include an external communication port 200 that is positioned on a cabinet 102 or which is otherwise accessible through cabinet 102. In general, external communication port 200 may be any suitable communications interface for interacting with an external source or device (identified herein generally by reference numeral 202). For example, according to exemplary embodiments, external communication port 200 may be an RJ45 network interface, a universal serial bus ("USB") interface, or any other suitable communications interface. According to exemplary embodiments, external communication port 200 is directly electrically and communicatively coupled to an appliance control board (e.g., controller 166).

External communication port 200 may generally be configured for facilitating wired communications between external device 202 and the associated appliance (e.g., such as washing machine appliance 100). For example, external communication port 200 may be used facilitate appliance programming, to perform appliance maintenance, to adjust operating parameters, to modify the operating software, or to perform any other action using washing machine appliance 100. While common uses of external communication port 200 may include appliance maintenance or manufacturer programming, this port may also inadvertently provide a security weakness or potential access point that may be used by hackers or other unauthorized user for nefarious or unauthorized purposes. In this regard, as noted above, an unauthorized user may plug in an external device 202 (such as a computer) to the RJ45 external communication port 200 using an electrical cable 204. In this manner, with the proper knowledge and skill, it may be possible for the unauthorized user to obtain undesirable access to the appliance control board.

Referring still to FIG. 3, washing machine appliance 100 may be in operative communication with a remote device such as a cell phone or other remote device 174 via a network 172. In addition, network 172 may contain or be in communication with a remote server 176. According to exemplary embodiments, external communication interface 170 may be used by the owner or an authorized user of washing machine appliance 100 to perform specific operating cycles, make appliance adjustments, authorize credits, manage a payment system, charge for operation, or perform other suitable commercial operations using washing machine appliance 100. In this regard, for example, an appliance owner may have a software application on their external device 174 (e.g., an app on their cell phone) that permits full interaction and control of the connected appliance through external communication interface 170.

Notably, as explained briefly above, appliances such as washing machine appliance 100 may commonly be involved in financial transactions, such as where the owner of the appliance has placed the appliance in a shared environment where people may pay to use one or more features of the appliance. Notably, consumers may try to tamper with these appliances in order to perform appliance operations, enable features, or otherwise cause the appliance to perform certain functions for free. For example, a consumer may make unauthorized access to washing machine appliance 100, e.g., via external communication port 200, in order to obtain such appliance access and control. Accordingly, aspects of the present subject matter are directed to systems and methods for preventing such unauthorized appliance tampering.

Now that the construction of washing machine appliance 100 and the configuration of controller 166 and external communication system 170 have been presented according to exemplary embodiments, an exemplary method 300 of operating a washing machine appliance will be described. Although the discussion below refers to the exemplary method 300 of operating washing machine appliance 100, one skilled in the art will appreciate that the exemplary method 300 is applicable to the operation of a variety of other washing machine appliances, such as vertical axis washing machine appliances. Moreover, method 300 may be used to prevent unauthorized access or use of any appliance, particularly commercial appliances. In exemplary embodiments, the various method steps as disclosed herein may be performed by controller 166 or a separate, dedicated controller.

According to various embodiments of the present subject matter, method 300 is generally intended to provide an owner or other supervisory user of washing machine appliance 100 with notice when a person or entity is attempting to interact with washing machine appliance 100 through external communication port 200. Moreover, method 300 may provide steps that facilitate interaction between the owner, the appliance, and any potential unauthorized users of the appliance (e.g., via external communication system). Although an exemplary implementation of method 300 is described below, it should be appreciated that variations and modifications to this method may be made while remaining within the scope of the present subject matter.

Figure 4:
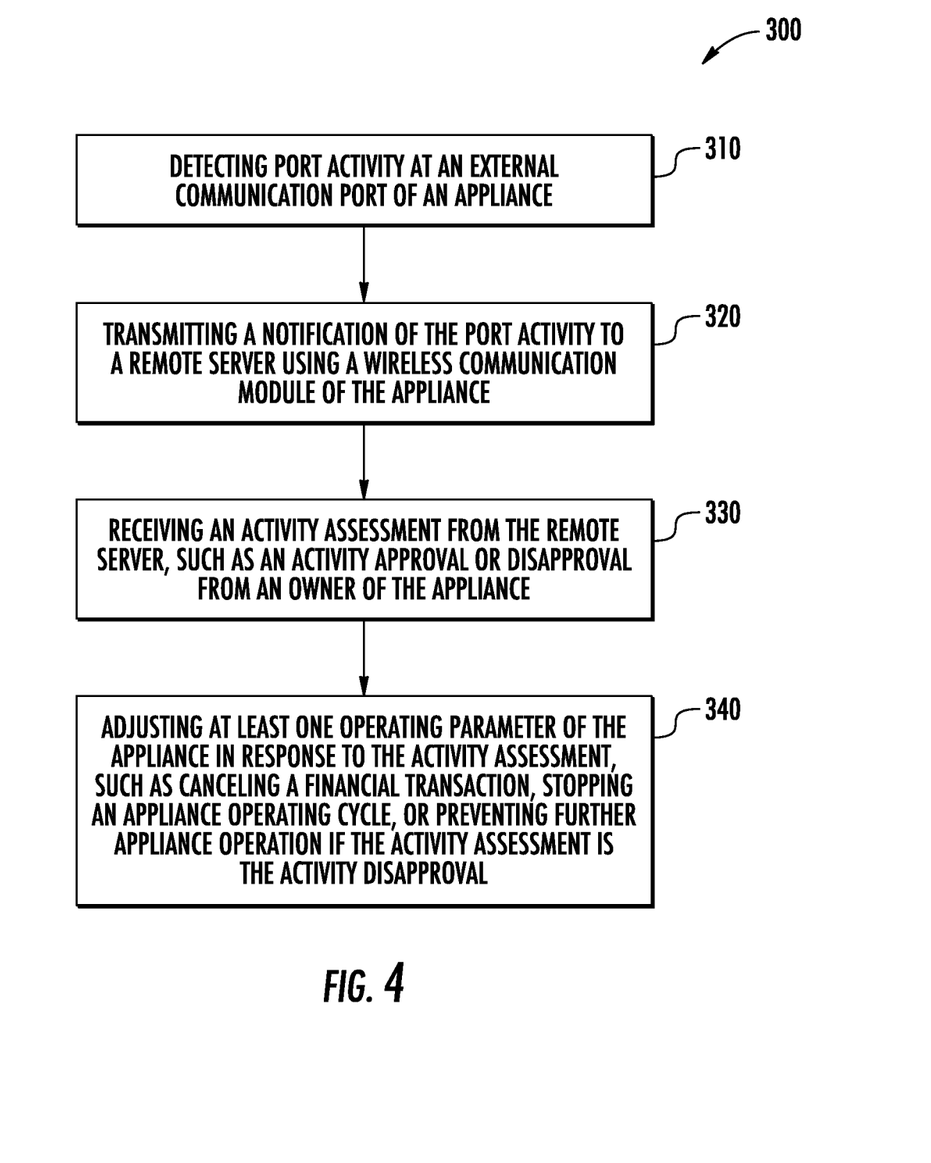
FIG. 4 illustrates a method for operating a washing machine appliance in accordance with one embodiment of the present disclosure.

Referring now to FIG. 4, method 300 includes, at step 310, detecting port activity at an external communication port of an appliance. For example, continuing the example from above, controller 166 of washing machine appliance 100 may detect port activity at external communication port 200, e.g., by detecting connection or data transfer through an RJ-45 communication interface. It should be appreciated that this port activity may be monitored by washing machine appliance 100 continuously, periodically, or upon any suitable trigger. According to alternative embodiments, this port activity may be determined in any other suitable manner. For example, detecting the port activity at the external communication port 200 may include determining that a connector has been plugged into the external communication port 200 (e.g., via a mechanical trigger or through electrical pulses generated upon contact) or determining that data has been transmitted through the external communication port 200.

Step 320 may include transmitting a notification of the port activity to a remote server using a wireless communication module of the appliance. In this regard, referring again briefly to FIG. 3, controller 166 is generally mounted within the appliance 100 and may include a wireless communication module 210 that may facilitate communication with external devices, e.g., via external communication system 170. Specifically, according to exemplary embodiments of the present subject matter, a wireless communication module 210 may be used to communicate with network 172, remote server 176, remote device 174, and/or external device 202.

Accordingly, when port activity is detected (e.g., at step 310), wireless communication module 210 may transmit a notification of that port activity to the remote server 176 or another device on network 172. According to exemplary embodiments, this notification may be further provided to an owner of the device. In this regard, method 300 may include providing the owner notification of port activity and receiving feedback from the owner or another authorized user, e.g., related to whether the port activity is valid or is tampering.

Step 330 may include receiving an activity assessment from the remote server, such as an activity approval or an activity disapproval from an owner of the appliance. For example, as explained above, the notification of port activity may be sent to the owner's remote device 174 and the activity assessment may be communicated from the remote device 174. Accordingly, the owner of the appliance may make a determination as to whether the attempted access of the appliance is authorized and may either permit or deny such access.

According to still other embodiments, the activity assessment may be automated feedback based on maintenance schedules or other data. For example, according to an exemplary embodiment, the remote server 176 may include a record or schedule of when an appliance service session is being performed. Notably, during an appliance service session, the technician commonly needs to plug into the external communications port 200 to access the appliance control board. Accordingly, if an appliance service session is being performed, method 300 may include presuming that the activity is authorized. By contrast, if access is attempted when an appliance service session is not being performed, method 300 may include assuming that the access is not authorized (or otherwise seek owner approval). Accordingly, method 300 may include determining that the activity assessment is an activity disapproval if the appliance service session is not being performed and may determine that the activity assessment is an activity approval if the appliance service session is being performed.

Method 300 may further include, at step 340, adjusting at least one operating parameter of the appliance in response to the activity assessment. For example, if the activity assessment was an activity approval, method 300 may include allowing the performance of operating cycles, the selection of features, or otherwise provide general access to washing machine appliance 100. In this regard, method 340 may include performing an operating cycle, activating one or more specific features or functions, or otherwise abiding by the instructions or data transmitted through external communications port 200.

By contrast, if the activity assessment was an activity disapproval, washing machine appliance 100 may generally prevent any action initiated through external communication port 200. More specifically, if the activity was disapproved, adjusting the at least one operating parameter may include canceling any financial transactions associated with or initiated by the port activity. In addition, adjusting the at least one operating parameter may include stopping an appliance operating cycle, disabling one or more operating features, or otherwise preventing further operation washing machine appliance 100.

Method 300 may further include communicating with the owner or an authorized user regarding the activity assessment. For example, according to an exemplary embodiment, step 340 may further include providing an owner notification regarding any activity disapprovals. For example, the owner notification may be provided through the user interface panel (e.g., such as control panel 160) or through a remote device 174 (such as a user's cell phone).

FIG. 4 depicts steps performed in a particular order for purposes of illustration and discussion. Those of ordinary skill in the art, using the disclosures provided herein, will understand that the steps of any of the methods discussed herein can be adapted, rearranged, expanded, omitted, or modified in various ways without deviating from the scope of the present disclosure. Moreover, although aspects of method 300 are explained using washing machine appliance 100 as an example, it should be appreciated that this method may be applied to the operation of any other appliance, particularly any commercial appliance.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. An appliance comprising:
   a cabinet;
   an external communication port physically mounted to the cabinet;
   a wireless communication module in wireless communication with a remote server through an external network; and
   a controller in wired operative communication with the external communication port and the wireless communication module, the controller being configured to:
   detect port activity at the external communication port;

transmit a notification of the port activity to the remote server using the wireless communication module;

receive an activity assessment from the remote server; and adjust at least one operating parameter of the appliance in response to the activity assessment.

2. The appliance of claim 1, wherein the external communication port is an RJ45 port.

3. The appliance of claim 1, wherein detecting the port activity at the external communication port comprises determining that a connector has been plugged into the external communication port or that data has been transmitted through the external communication port.

4. The appliance of claim 1, wherein the activity assessment comprises at least one of an activity approval or an activity disapproval.

5. The appliance of claim 1, wherein the controller is in operative communication with a remote device through the external network, and wherein the activity assessment is communicated from the remote device.

6. The appliance of claim 1, wherein the controller is further configured to:

provide an owner notification regarding the port activity; and receive an owner confirmation regarding the port activity.

7. The appliance of claim 1, wherein the controller is further configured to:

determine that an appliance service session is being performed, wherein the activity assessment is an activity approval if the appliance service session is being performed.

8. The appliance of claim 1, wherein the controller is further configured to:

determine that an appliance service session is not being performed, wherein the activity assessment is an activity disapproval if the appliance service session is not being performed.

9. The appliance of claim 1, wherein the activity assessment comprises an activity disapproval, and wherein adjusting the at least one operating parameter comprises:

providing an owner notification regarding the activity disapproval.

10. The appliance of claim 9, further comprising:

a user interface panel, wherein the owner notification is provided through the user interface panel.

11. The appliance of claim 9, wherein the controller is in operative communication with a remote device through the external network, and wherein the owner notification is provided through the remote device.

12. The appliance of claim 1, wherein the activity assessment comprises an activity disapproval, and wherein adjusting the at least one operating parameter comprises:

canceling a financial transaction or an appliance operating cycle.

13. The appliance of claim 1, wherein the activity assessment comprises an activity disapproval, and wherein adjusting the at least one operating parameter comprises:

preventing further appliance operation.

14. The appliance of claim 1, wherein the activity assessment comprises an activity approval, and wherein adjusting the at least one operating parameter comprises:

performing an operating cycle.

15. The appliance of claim 1, wherein the appliance is a washing machine appliance, a dryer appliance, or a combination washer/dryer appliance.

16. A method of operating an appliance, the appliance comprising an external communication port physically mounted to a cabinet of the appliance and a wireless communication module in wireless communication with a remote server through an external network, the method comprising:

detecting port activity at the external communication port;

transmitting a notification of the port activity to the remote server using the wireless communication module;

receiving an activity assessment from the remote server; and adjusting at least one operating parameter of the appliance in response to the activity assessment.

17. The method of claim 16, wherein detecting the port activity at the external communication port comprises determining that a connector has been plugged into the external communication port or that data has been transmitted through the external communication port.

18. The method of claim 16, further comprising:

determining that an appliance service session is being performed, wherein the activity assessment is an activity approval if the appliance service session is being performed.

19. The method of claim 16, wherein the activity assessment comprises an activity disapproval, and wherein adjusting the at least one operating parameter comprises:

providing an owner notification regarding the activity disapproval using either a user interface panel or a remote device.

20. The method of claim 16, wherein the activity assessment comprises an activity disapproval, and wherein adjusting the at least one operating parameter comprises:

canceling a financial transaction, stopping an appliance operating cycle, or preventing further appliance operation.

* * * * *